United States Patent

[11] 3,608,752

| | | |
|---|---|---|
| [72] | Inventors | John L. Peterson; George H. Pettis, both of Spokane, Wash. |
| [21] | Appl. No. | 848,978 |
| [22] | Filed | Aug. 11, 1969 |
| [45] | Patented | Sept. 28, 1971 |
| [73] | Assignee | Atlas Spokane, Inc. |

[54] STORAGE FACILITY FOR PARTICULATE MATERIAL
5 Claims, 8 Drawing Figs.

[52] U.S. Cl. ................................................ 214/17 DA, 198/126
[51] Int. Cl. ................................................ B65g 65/42
[50] Field of Search ........................................ 214/17.82; 198/126, 203

[56] References Cited

UNITED STATES PATENTS

| 812,230 | 2/1906 | Raymond | 214/17 (.82) |
| 3,268,065 | 8/1966 | Thompson | 198/203 |

FOREIGN PATENTS

| 86,597 | 6/1936 | Sweden | 214/17 (.82) |

OTHER REFERENCES

German Printed Application 2-60 Pohlig 214-17 (.82)

Primary Examiner—Robert G. Sheridan
Attorney—Wells & St. John

ABSTRACT: A storage facility has a rectangular cross section with sidewalls elevated above a floor providing side openings between the walls and the floor. A continuous drag line is slidably mounted on the floor between dual carriages that ride on the rails outside the sidewalls for removing the particulate from the floor to conveyors at the edges of the floor. Motors drive the continuous drag line while the carriages move on the rails to move the continuous drag line into the particulate pile.

INVENTOR.
John L. Peterson
George H. Pettis
BY
Wells & St. John
Attys

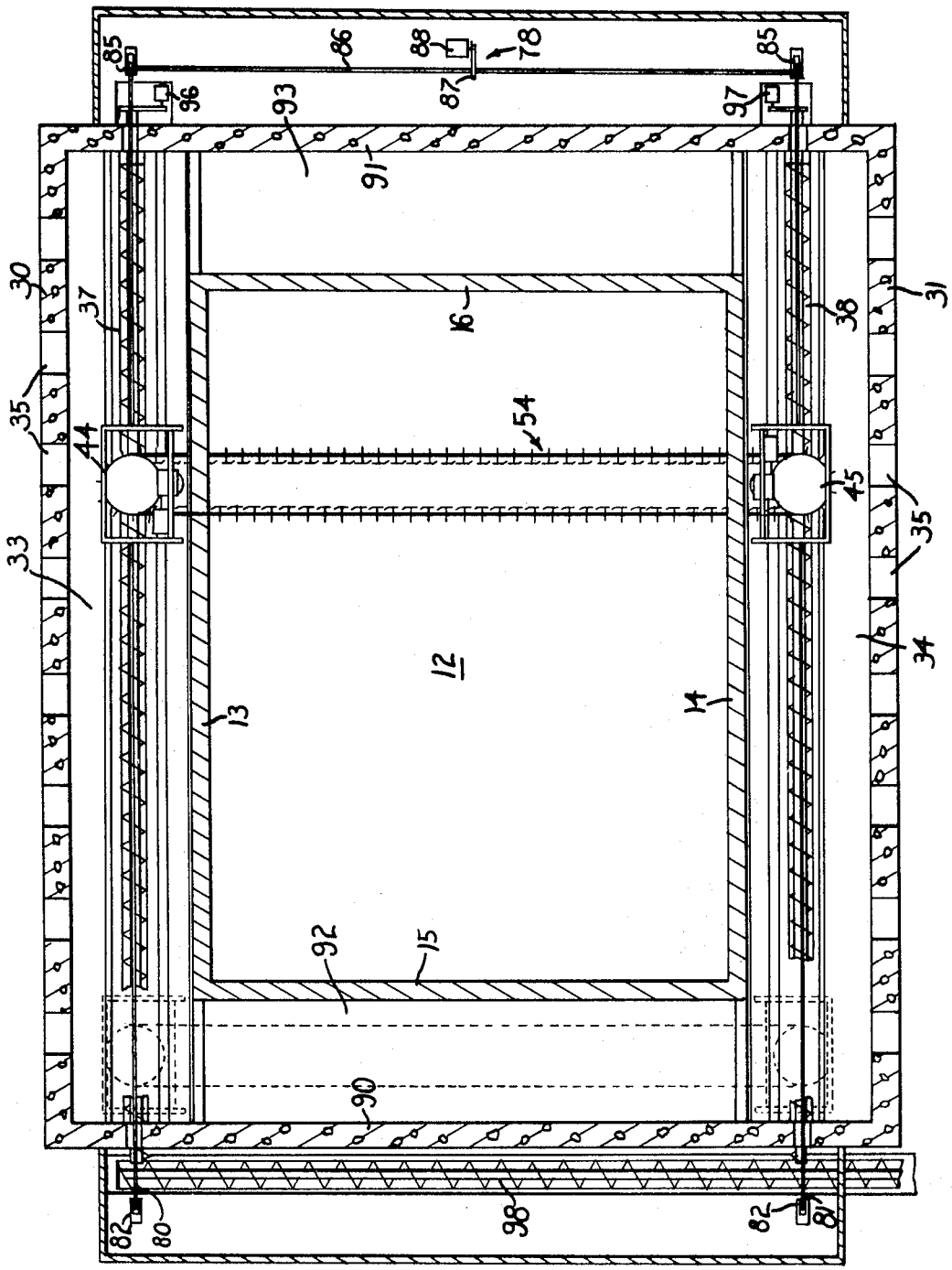

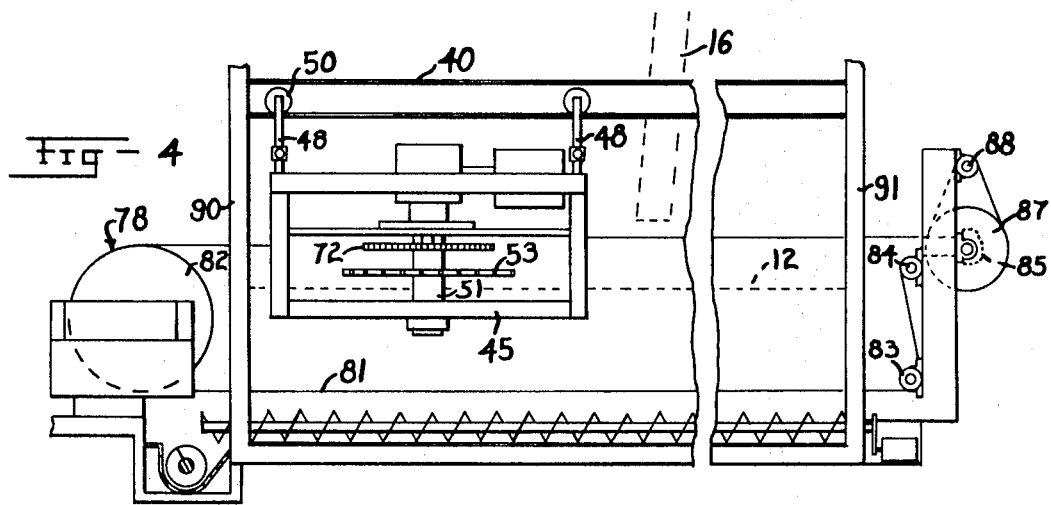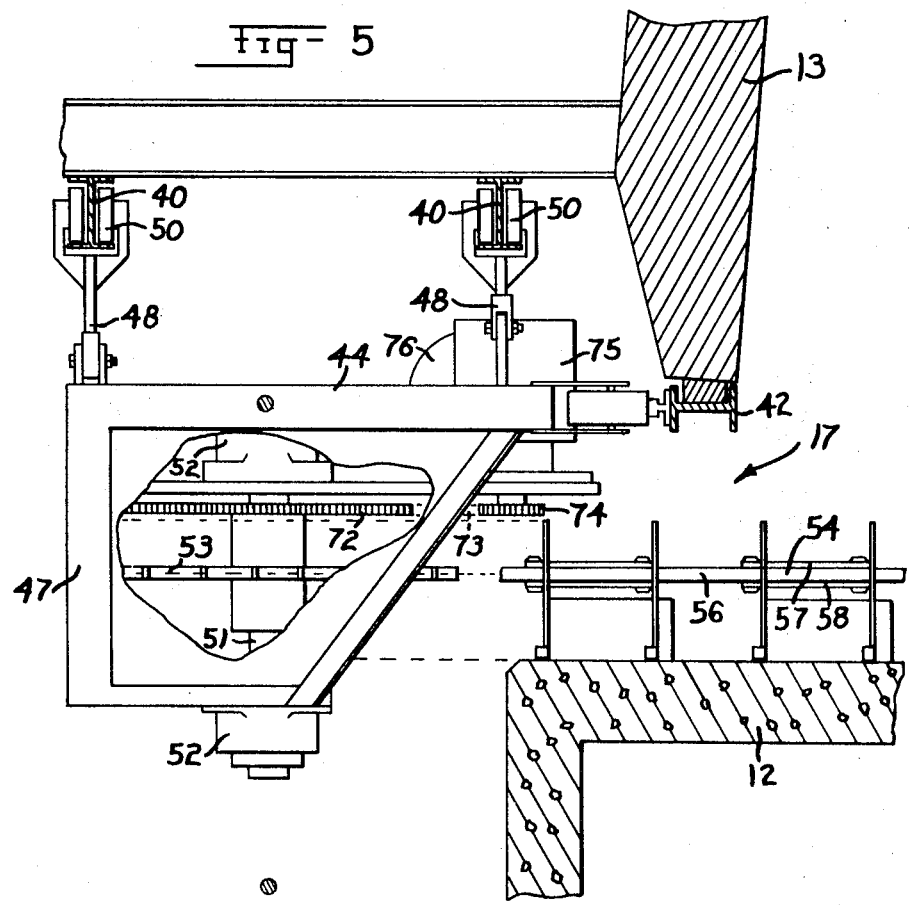

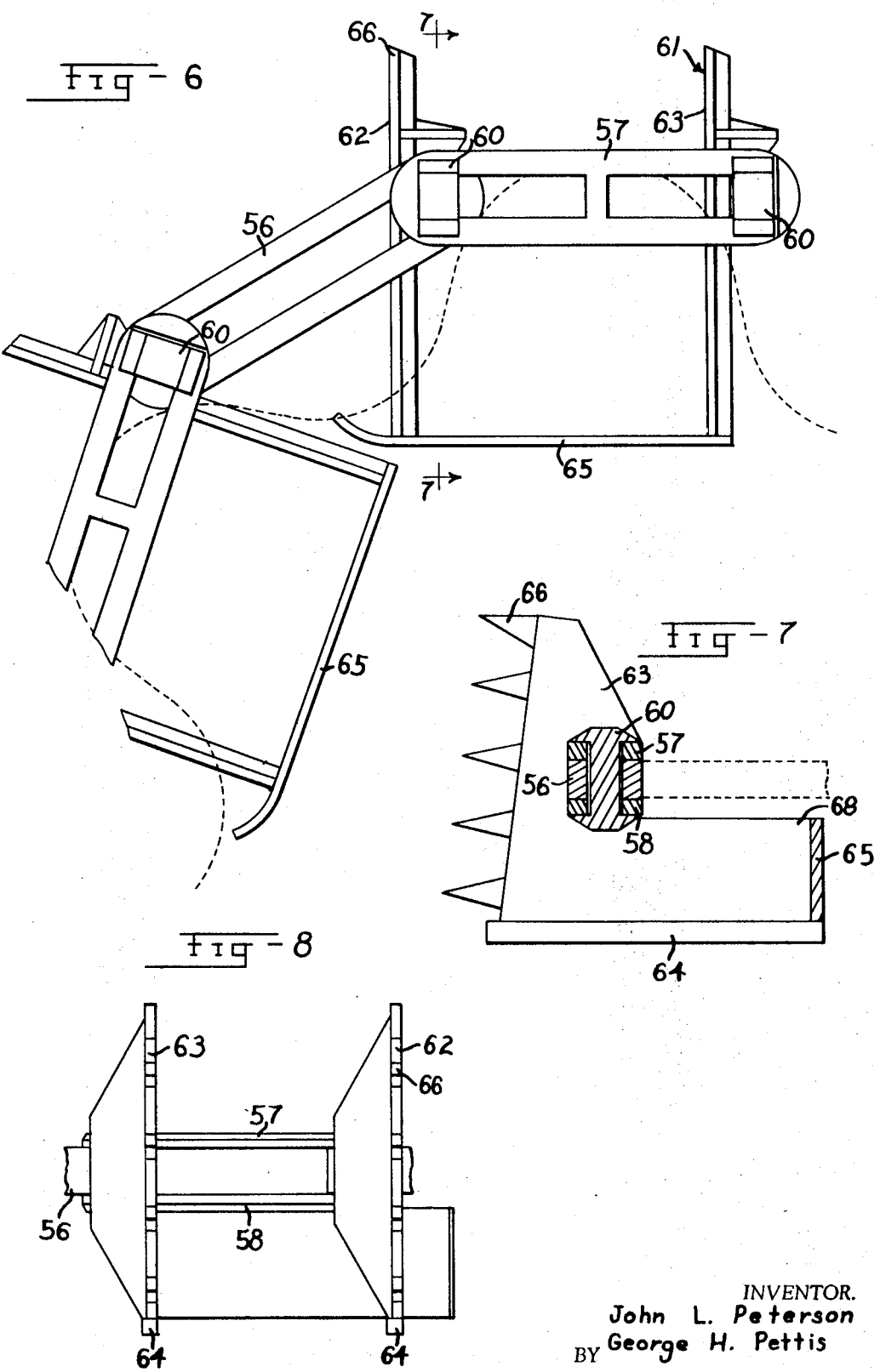

3,608,752

STORAGE FACILITY FOR PARTICULATE MATERIAL

BACKGROUND OF THE INVENTION

This invention relates to an improved storage facility for particulate or granular materials and more particularly to improved apparatus for handling and removing the material from the facility.

As a general proposition the loading of storage bins and facilities can be accomplished with considerable ease with conventional conveyors and distributing apparatus. However, the unloading of the storage facility from the bottom is another story. Several devices have been devised for removing the material from a cylindrical storage facility by biting into the outside of the base of the pile and removing material therefrom. In such an apparatus it is seldom that the material at the center is removed. It has been found very difficult to construct an apparatus that is capable of removing and handling the material in a first-in, first-out basis. This problem is further accented by the use of rectangular storage bins even though rectangular storage bins have certain advantages over cylindrical bins or tanks.

The storage facility of the present invention provides a rectangular storage facility for the storage and handling of particulate material or granular material such as sawdust in which the material may be emptied from the base of the facility on a first-in, first-out basis while minimizing the possibility of breakage to the handling equipment and apparatus.

An additional object to this invention is to provide a rectangular storage facility having a continuous drag line that is moved along the floor of the facility for removing the material from the base of the material pile in which the drive mechanisms for the drag line are not positioned underneath the pile or subjected to the weight of the pile.

A further object of this invention is to provide a rectangular storage having a continuous drag line that moves along the floor, in which the drag line may be moved from underneath the pile during each cycle of operation.

An additional object of this invention is to provide a rectangular storage facility having a granular material removal system which is economical to construct, efficient in operation and easy to maintain.

These and other objects and advantages to this invention will become apparent upon the reading of the following detailed description of a preferred embodiment.

BRIEF DESCRIPTION OF THE DRAWINGS

A preferred embodiment of this invention is illustrated in the accompanying drawings, in which:

FIG. 3 is a horizontal cross-sectional sectional view taken along line 3—3 in FIG. 2 showing in plan view the particle removal system with the drag line shown underneath the material pile in solid line and shown with the drag line removed from the pile in dotted line;

FIG. 4 is a vertical cross-sectional view taken along line 4—4 in FIG. 1 showing the drive means for moving one of the carriages;

FIG. 5 is an enlarged end view showing one of the carriages in considerable detail;

FIG. 6 is a fragmentary plan view of a section of the dragline;

FIG. 7 is a vertical cross-sectional view taken along line 7—7 in FIG. 6; and

FIG. 8 is a side view of a section of the drag line shown in FIG. 6.

DETAILED DESCRIPTION OF A PREFERRED EMBODIMENT

Figure 1:
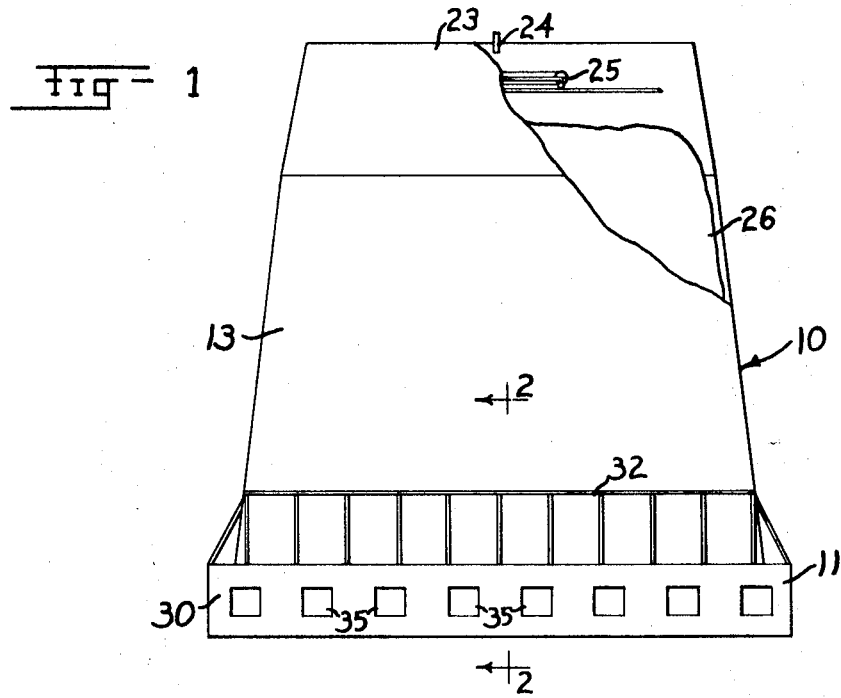
FIG. 1 is a fragmentary side view of a storage facility embodying the principles of this invention.
Figure 2:
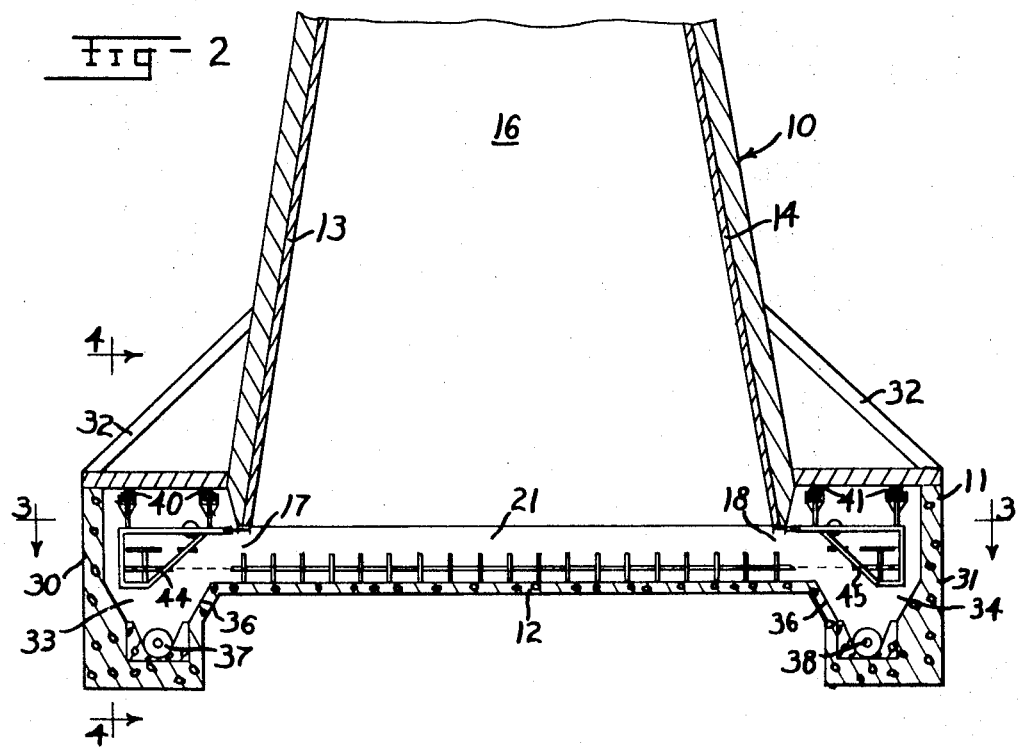
FIG. 2 is a vertical cross-sectional view taken along line 2—2 in FIG. 1 showing dual carriages for supporting a drag line for removing material from the base of the storage facility.

Referring now in detail to the drawings, there is shown in FIG. 1 a storage facility 10 having a horizontal rectangular cross section mounted on a foundation or base 11 with a horizontal floor 12 (FIG. 2) supporting granular or particulate material within the facility to define a pile. Storage facility has opposing inclined sidewalls 13 and 14 and opposing inclined end walls 15 and 16. The end and sidewalls are supported above the floor 12 provided unobstructed side openings 17 and 18 between the floor and the sidewalls 13 and 14 respectively and unobstructed end openings 20 and 21 between the floor and the end walls 15 and 16 respectively.

The storage facility has a roof or top 23 enclosing the storage facility with an inlet 24 projecting through the roof 23 for depositing the particulate material into the storage facility.

A conventional distributing conveyor 25 is mounted in the storage facility adjacent to the roof for distributing the particulate material in a substantially uniform manner over the entire floor to create a rectangular material pile 26.

Side support walls 30 and 31 are formed on the foundation 11 outside the sidewalls 13 and 14 with bracing 32 mounted thereon for supporting the sidewalls 13 and 14 respectively.

The side support walls 30 and 31 form elongated side spaces 33 and 34 (FIG. 2) along the outside of the sidewalls 13 and 14 communicating with the unobstructed openings 17 and 18. Side holes 35 (FIG. 1) are formed in support walls 30 and 31 to provide access to the elongated side spaces 33 and 34. The bottom of the side spaces 33 and 34 have inclined surfaces 36 communicating with the floor 12 for guiding particulate materials to screw conveyors 37 and 38 that are mounted at the base of the side spaces 33 and 34 respectively. The screw conveyors 37 and 38 move the particles along the length of the facility outside the sidewalls 13 and 14.

Parallel carriage I-beam rails 40 and 41 are mounted to the underside of the bracing 32 in parallel arrangement for supporting carriages 44 and 45 respectively. Parallel guide rails 42 are mounted on the bottom of the walls 13 and 14 for providing lateral support to the carriages. The carriages 44 and 45 are substantially mirror images of each other.

Each of the carriages 44 and 45 has a frame 47 (FIG. 5) with upward extending brackets 48 having wheels 50 affixed to the ends thereof for riding in the I-beam rails 40 and 41. The carriages are supported in a depending manner in the side spaces 33 and 34 directly over the screw conveyors 37 and 38. A vertical shaft 51 is rotatably mounted on the carriage in bearings 52. A drag line sprocket 53 is affixed on the shaft 51.

As part of the particle removal apparatus, the storage facility has a continuous drag line 54 that is supported between the carriages 44 and 45 by the drag line sprockets 53. The continuous drag line 54 is composed of rivetless links in which each pitch has a center link 56 and side bars 57 and 58. A pin 60 (FIGS. 6–8) interconnects the side bars 57 and 58 with the center link 56. Rigid buckets 61 are affixed to the links for digging into the pile 26 and moving the material through the side openings 17 or 18 to the screw conveyors 37 and 38. Each of the buckets 61 has a front plate 62 and a back plate 63 with an interconnecting bottom shoe 64 that rides on the floor 12. An inside deflector plate 65 is affixed between the front plate and the backplate on the inside of the drag line so that the parallel flights of the line do not become caught or entangled. It should be noted at this point that there is no flight bar or lateral support between the drag line sprockets 53 for laterally supporting the flights of the line. Between the chain sprockets 53, the drag line is only supported by the floor 12. Bucket teeth 66 are formed on the outer ends of the plates 62 and 63 for digging into the pile and to break up any clumps or heavily compacted material.

As shown in FIG. 7 the plates 62 and 63 have reduced inside sections 68 that enables the sprockets 53 to engage the rivotless links.

Separate drive means are mounted on each of the carriages for driving the chain from both ends. Each driving means includes a sprocket 72 (FIG. 5) affixed to the vertical shaft 51 with a chain 73 extending to a sprocket 74 mounted on a speed reducer 75. The speed reducer 75 is driven by a motor 76. Driving the continuous drag chain from both ends prevents slack from developing in either of the flights to efficiently drive the chain independently of the direction the chain is moved by the carriages.

A reversible drive means 78 (FIGS. 3 and 4) is operatively connected to both of the carriages 44 and 45 for reciprocating the carriages on the rails 40 and 41 respectively to move the drag chain 54 along the entire length of the floor between the end walls 15 and 16. The carriage 44 is affixed to a substantially continuous chain 80 and the carriage 45 is affixed to a substantially continuous chain 81. The chains 80 and 81 are supported at one end by large idler sprockets 82. At the other end the chains 80 and 81 are supported by idler sprockets 83, idler sprockets 84 and drive sprockets 85. Sprockets 85 are mounted on a common drive shaft 86. A drive sprocket 87 is affixed to the shaft 86 with a reversible motor 88 driving the sprocket 87. The motor 88 moves the carriages at the same rate so that the carriages are transversely aligned as the drag chain is moved back and forth over the floor along the length of the floor. The storage facility has end support walls 90 and 91 that are formed on the foundation outside and spaced from the end walls 15 and 16 respectively providing end spaces 92 and 93 communicating with the end openings 20 and 21 respectively. The spaces 92 and 93 enable the drag line 54 to be moved out from underneath the pile at either end of the storage facility. This feature is particularly useful if the continuous drag line 54 becomes damaged or broken. The drag line may be repaired in the space 92 or 93 without having to disassemble the carriages or the drive means 78. If the drag line becomes broken, a person can enter one of the spaces 33 and 34 through the holes 35 and pull the drag line out and then move the carriages to the end and put a new drag line on.

As shown in FIG. 3 the screw conveyors 37 and 38 are driven by respective motors 96 and 97. The screw conveyors 37 and 38 move the granular material to a transverse receiving screw conveyor 98 that conveys the material from the storage facility.

The embodiment as shown is particularly effective for removing sawdust from the storage facility and conveying the sawdust in a continuous manner to a boiler or a similar energy utilization process.

It should be particularly noted that all of the drive mechanisms are out of the way of the pile and are not mounted underneath the pile being subjected to the weight of the pile. The drag chain sprockets 53 are elevated above the screw conveyors 37 and 38 so that the particulate material can flow through the side openings 17 and 18 without clogging the drive. Furthermore, the carriage drive is mounted outside the storage enclosure and is not subjected to the hazards of cave-in.

What is claimed is:

1. A storage facility having a substantially rectangular horizontal cross section for receiving granular material at the top of the storage facility to form a pile and removing the granular material from the base of the pile, said facility comprising:
    a. a substantially horizontal floor at the base of the facility for supporting the pile;
    b. two opposing upright sidewalls elevated above the floor providing side openings between the floor and the sidewalls;
    c. two conveyors mounted adjacent to the floor outside the two opposing sidewalls for conveying the material from the facility;
    d. dual carriages mounted adjacent to the base of the facility for parallel movement along the outside of the sidewalls, in which each carriage has a dragline sprocket;
    e. a movable continuous chain dragline mounted on the sprocket defining two substantially parallel flights that extend between the dual carriages through the side openings with both flights supported by the floor between the sprockets for movement over the floor to enable the continuous dragline to remove material from the pile along both flights of the continuous dragline and convey the material underneath both sidewalls through the side openings to feed both conveyors;
    f. a first drive means having a motor mounted on each of the dual carriages and operatively connected to the associated sprocket for driving both dragline sprockets simultaneously to pull both flights over the floor; and
    g. a second drive means operatively connected to the dual carriages for moving the carriages along the outside of the sidewalls to move the dragline transversely over the floor and into the base of the pile.

2. A storage facility as defined in claim 1 wherein deflector plates are mounted to the dragline for projecting to the inside of the flights to prevent the parallel flights from becoming caught or entangled.

3. A storage facility as defined in claim 1 further comprising buckets fixed at intervals to the continuous drag line for digging into the pile and conveying the material to the conveyors.

4. A storage facility as defined in claim 1 further comprising end walls elevated above the floor providing end openings between the end walls and the floor and wherein the second drive means moves the continuous drag line through at least one of the end openings to remove the drag line from beneath the pile during each cycle of operation.

5. A storage facility as defined in claim 1 wherein the dual carriages are dependently supported on rails above the conveyors.